United States Patent Office 3,407,031
Patented Oct. 22, 1968

3,407,031
PROCESS FOR THE MANUFACTURE OF
INORGANIC CHLORIDES
Heini Fuerer, Basel, and Wilfried Rockenbauer, Therwil, Switzerland, assignors to Ciba Limited, Basel, Switzerland, a company of Switzerland
No Drawing. Filed Mar. 29, 1966, Ser. No. 538,199
Claims priority, application Switzerland, May 22, 1965, 7,144/65
7 Claims. (Cl. 23—15)

ABSTRACT OF THE DISCLOSURE

A process is provided for the manufacture of the chlorides of the elements vanadium, molybdenum, tungsten, tantalum, niobium, titanium and boron by chlorination of a mixture of ferro-alloys, carbides or hard metal scrap of these elements and sodium chloride with a liquid melt of sodium chloride and ferric chloride. The resulting vapour-form chloride of the element is removed from the reaction zone and condensed.

---

A need exists for a streamlined and cheap process for the manufacture of the chlorides of the elements vanadium, molybdenum, tungsten, tantalum, niobium, titanium and boron, especially the chlorides of the metals tantalum and niobium. It is known that certain of these chlorides may be manufactured by the chlorination of ferro-alloys of such elements. In this process ferric chloride is always produced alongside the chloride of the alloy element. The separation of the chlorides produced is difficult. In the processes hitherto known, the ferro-alloys are chlorinated by means of gaseous chlorine which is passed through the bed of the heated alloy in lump form. In order to separate off the ferric chloride, the mixture of the chloride vapours is passed through a bed of heated sodium chloride whereby the ferric chloride is retained and the chloride of the alloy element remains in the vapour form so that it can be separately condensed. Complicated apparatus is necessary to carry out this process. The process furthermore has heat technology disadvantages. These are caused by the fact that the chlorination is carried out with ferro-alloys in lump form. The chlorination takes place exothermically so that cooling devices have to be provided, whose action is however not as effective as desired since heat removal from the lump-shaped material is inadequate and irregular. On the other hand it is necessary to heat the sodium chloride bed which is needed for the absorption of the iron chloride to a high temperature at which the sodium chloride/iron chloride complex is liquid.

It is now the purpose of the present invention to overcome the disadvantages described. The invention relates to a process for the manufacture of chlorides of vanadium, moylbdenum, tungsten, tantalum, niobium, titanium and boron by chlorination of ferro-alloys, carbides or hard metal scrap of these elements and is characterised by introducing a mixture of such an alloy, or of a carbide, or of hard metal scrap, with sodium chloride into a liquid melt of sodium chloride and ferric chloride, removing the resulting vapour-form chloride of the alloy element or carbide element from the reaction zone, and condensing it.

In the present invention the ferro-alloy or carbide is not chlorinated by gaseous chlorine but by the complex ferric chloride which is present and produced in the melt. If one works discontinuously, the melt may be used until the greater part of the ferric chloride has been reduced. If it is intended to work continuously it is advisable to re-chlorinate the iron chloride by introducing gaseous chlorine into the melt. This may take place either within or outside the reaction zone, a chlorine yield of practically 100% being achieved and the chlorine excess which is unavoidable in the usual chlorination processes here being avoided. The absence of foreign gases which characterise conventional chlorinations ($Cl_2$-excess, CO, $CO_2$, HCl) here permits the advantageous condensation of the metal chloride as a liquid; the equipment disadvantages of condensing a solid from the vapour phase are thus avoided.

The temperature range in which the present process can be carried out is rather large and extends from 155 to 700° C. Melt temperatures of 400 to 600° C. are preferably chosen. The particle size of the alloy also plays a part in the smooth functioning of the process and is preferably between 1 and 5 mm. when working discontinuously whereas finer particle sizes are more suitable for the continuous process. Excessively fine alloys frequently react too vigorously, and alloys of larger particle size react too slowly. The sodium chloride is appropriately added in stoichiometric amounts, preferably using an excess of about 10%.

The process of the present invention is especially suitable for the manufacture of niobium pentachloride and tantalum pentachloride starting from the corresponding ferro-alloys, and it is especially advantageous to use such alloys as are produced by treating oxide ores with aluminum, silicon or carbon. It is also possible to employ alloys which contain several metals in addition to iron, such as ferro-niobium-tantalum.

As has been mentioned, the process is also suitable for the manufacture of chlorides from carbides or for the working-up of hard metal scraps to recover tungsten, titanium, niobium and tantalum in the form of the corresponding chlorides which may, after conversion to the oxides and subsequent carbidisation, again be used for the manufacture of hard metals. The process may be carried out in simple apparatus and permits simple temperature control since the reaction medium is a liquid melt which allows good heat transfer.

Example 1

81.1 g. of sublimed $FeCl_3$ are heated with 29.2 g. of NaCl to 400° C. in a 500 ml. sulphonation flask equipped with a filling tube and a gas outlet tube. A mixture of 20 g. of ferro-niobium (67% Nb content) particle size >250µ, and 8 g. of NaCl (which has previously been fused at 900° C.) is added to the resulting liquid complex, with stirring. The ferro-niobium reacts with the $FeCl_3$-NaCl complex to form $NbCl_5$. The resulting $NbCl_5$ vapours are led away from the flask and are condensed. The yield of $NbCl_5$ is 27.2 g. or 69.8% of theory. The Fe-content is 400 parts per million of Fe.

Example 2

A mixture of 3.24 kg. of sublimed $FeCl_3$ and 1.17 kg. of fused NaCl are heated to 400° C. in a 10 litre glass sulphonation flask equipped with filling tube and gas inlet and outlet tubes. 0.9 m.³ of chlorine/hour are introduced into the resulting liquid.

Additionally a mixture of 300 g. of ferro-niobium of particle size >1 mm. and 102 g. of NaCl is added to the melt every 10 minutes. The resulting chloride vapours are led away from the flask and condensed as a liquid. The experiment is interrupted after 2 hours and the chloride produced is weighed. The weight of condensed material is 6.33 kg. or 98.4% of theory. The Fe-content of the product is 130 parts per million.

Example 3

About 400 ml. of $NaFeCl_4$ are heated to 550° C. in a 2 litre glass sulphonation flask provided with a filling tube and gas inlet and outlet tubes. A mixture of 9.75 g. of NaCl and 30 g. of ferro-tantalum is then added first of all. After 3 minutes, a mixture of 32.5 g. of NaCl and 100 g. of ferro-tantalum is added ten times at intervals of 10 minutes. At the same time 0.2 m.$^3$ of chlorine are passed into the melt. The resulting chlorides are condensed. At the end of the experiment chlorine continues to be passed in until the melt does not absorb any further chlorine. The weight of the chlorides is 1.23 kg. corresponding to a yield of 82.5%. The Fe-content of the product obtained is 800 parts per million.

The following compounds and metals were treated by the same method: ferro-titanium, ferro-tungsten, ferro-molybdenum, ferro-vanadium, tantalum metal, niobium metal, TaC, NbC.

The table which follows contains information as to the most favourable reaction temperature, yield, composition of the chlorides obtained and Fe-content of the chlorides.

| Compound or alloy | Reaction Temperature (° C.) | Yield (percent) | Product | Fe-content (percent) |
|---|---|---|---|---|
| Ferro-titanium | 550 | 80.0 | TiCl$_4$ | ($^1$) |
| Ferro-tungsten | 600 | 70.7 | WCl$_{5.3}$ | 0.5 |
| Ferro-molybdenum | 580 | 85.3 | MoCl$_{4.25}$ | 0.5 |
| Ferro-vanadium | 540 | 85.1 | VCl$_4$ | ($^2$) |
| Tantalum | 430 | 95.7 | TaCl$_5$ | 0.94 |
| Niobium | 360 | 86.0 | NbCl$_5$ | 0.3 |
| Tantalum carbide | 550 | 75.4 | TaCl$_5$ | 4.5 |
| Niobium carbide | 480 | 93.1 | NbCl$_5$ | 1.96 |
| Hard metal scrap | 650 | 85.3 | TiCl$_4$, TaCl$_5$, NbCl$_5$, WCl$_6$ | 7.3 |

$^1$ App.: 100 parts per million.
$^2$ App.: 200 parts per million.

What is claimed is:

1. A process for the manufacture of chlorides of an element selected from the group consisting of vanadium, molybdenum, tungsten, tantalum, niobium, titanium and boron which comprises chlorinating a mixture of a member selected from the group consisting of a ferro-alloy, a carbide and hard metal scrap of said element with sodium chloride with a liquid melt of sodium chloride and ferric chloride, forming NaFeCl$_4$, at a temperature between 150 and 700° C. removing the resulting vapour-form chloride of the element from the reaction zone, and condensing it.

2. A process according to claim 1 wherein the chlorinating is carried out at a temperature of about 400 to 600° C.

3. A process according to claim 1 which comprises using alloys of a particle size of about 1 to 5 mm.

4. A process according to claim 1 which comprises adding sodium chloride in an excess of about 10% to said mixture over the stoichiometrically calculated 1:1 quantity.

5. A process according to claim 1 which comprises using ferro-niobium.

6. A process according to claim 1 which comprises using ferro-tantalum.

7. A process according to claim 1 which comprises introducing chlorine into the melt of sodium chloride and ferric chloride, in order to chlorinate the ferrous chloride which has been formed to ferric chloride.

References Cited

UNITED STATES PATENTS 2,928,722   3/1960   Scheller _____ 23—17 X
2,940,827   6/1960   Groves _____ 23—87

FOREIGN PATENTS 163,358   6/1964   U.S.S.R.

OSCAR R. VERTIZ, *Primary Examiner.*

H. T. CARTER, *Assistant Examiner.*